United States Patent
Silin

(10) Patent No.: US 12,534,196 B2
(45) Date of Patent: Jan. 27, 2026

(54) VARIABLE BLADE PITCH SYSTEMS AND METHODS

(71) Applicant: FLIR Unmanned Aerial Systems ULC, Vancouver (CA)

(72) Inventor: Dmytro Silin, Waterloo (CA)

(73) Assignee: FLIR Unmanned Aerial Systems ULC, Vancouver (CA)

(*) Notice: Subject to any disclaimer, the term of this patent is extended or adjusted under 35 U.S.C. 154(b) by 0 days.

(21) Appl. No.: 18/765,117

(22) Filed: Jul. 5, 2024

(65) Prior Publication Data

US 2025/0010984 A1  Jan. 9, 2025

Related U.S. Application Data

(60) Provisional application No. 63/512,583, filed on Jul. 7, 2023.

(51) Int. Cl.
*B64C 27/78* (2006.01)
*B64U 30/297* (2023.01)
*F01D 7/00* (2006.01)

(52) U.S. Cl.
CPC ............ *B64C 27/78* (2013.01); *B64U 30/297* (2023.01); *F01D 7/00* (2013.01); *B64U 2201/10* (2023.01); *F05D 2220/90* (2013.01); *F05D 2240/30* (2013.01); *F05D 2260/74* (2013.01)

(58) Field of Classification Search
CPC ......... F01D 7/00; B64C 27/78; B64U 30/297; B64U 2201/10; B64U 50/19; F05D 2220/90; F05D 2240/30; F05D 2260/74
See application file for complete search history.

(56) References Cited

U.S. PATENT DOCUMENTS

| | | | |
|---|---|---|---|
| 2,500,811 A | 3/1950 | Graham | |
| 3,895,884 A | 7/1975 | Andrews | |
| 10,464,670 B2* | 11/2019 | Enke | G05D 1/854 |
| 10,797,547 B2* | 10/2020 | Randall | B64C 29/00 |
| 10,988,247 B2* | 4/2021 | Iskrev | B64C 11/32 |
| 11,548,617 B2* | 1/2023 | Fenny | B64U 30/10 |
| 11,584,541 B2* | 2/2023 | List | B64D 31/06 |
| 12,288,471 B2* | 4/2025 | Wiegman | G08G 5/53 |
| 2012/0134829 A1* | 5/2012 | Vance | F03D 7/06 |
| | | | 416/155 |

(Continued)

OTHER PUBLICATIONS

Martelli M., "Marine Propulsion Simulation, Chapter 6: Propeller and Pitch Change Mechanism," 2015.

(Continued)

*Primary Examiner* — Brian P Wolcott
(74) *Attorney, Agent, or Firm* — Haynes and Boone, LLP

(57) ABSTRACT

Systems and methods are provided to control a rotor blade pitch. In one example, a system comprises a ratchet mechanism comprising a ratchet wheel configured to be rotated by a motor about a first axis. The ratchet mechanism comprises one or more followers each of which is coupled to the ratchet wheel. The ratchet wheel rotates the one or more followers in a first direction about the first axis when the ratchet wheel is rotated by the motor in the first direction about the first axis. One or more rotor blades rotate about the first axis. Each rotor blade is affixed to a respective follower. Each follower controls a pitch of the respective rotor blade based on a position of the follower relative to the ratchet wheel.

20 Claims, 10 Drawing Sheets

(56) References Cited

U.S. PATENT DOCUMENTS

2020/0140073 A1* 5/2020 LeGrand ................. B64C 27/41
2020/0391847 A1* 12/2020 Fenny .................... B64C 11/06
2024/0274020 A1* 8/2024 Wittmaak ............. B64C 39/024

OTHER PUBLICATIONS

Navy Education & Training Center, "Navy Aviation Machinist's Mate 3 & 2 0 NAVEDTRA 14008, Nonresident Training Course," 2013.

* cited by examiner

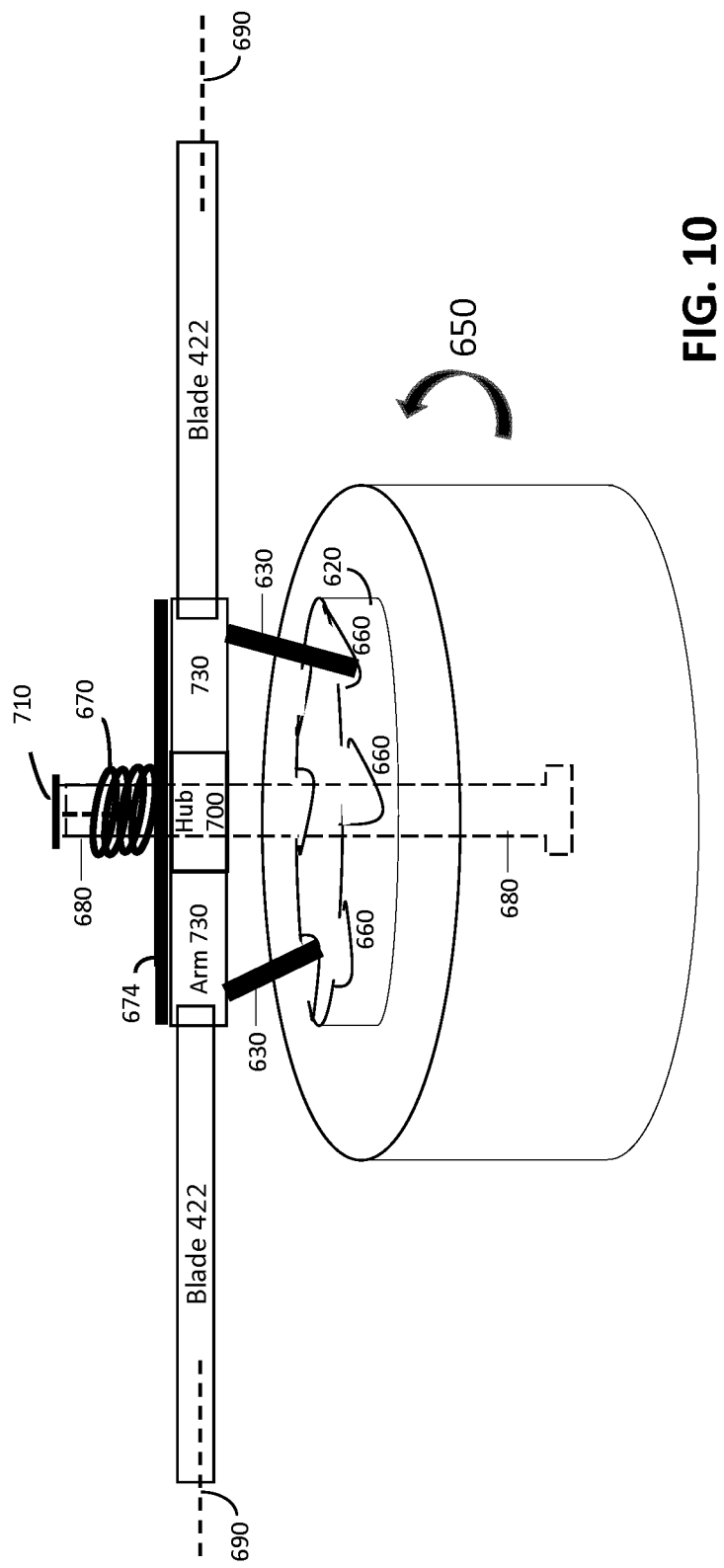

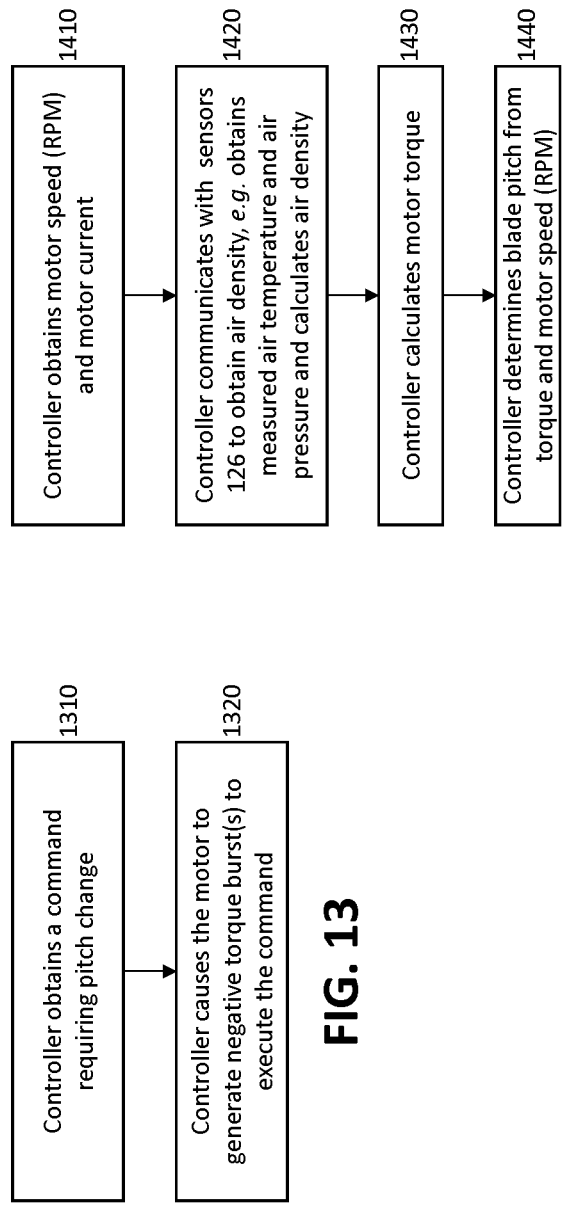

VARIABLE BLADE PITCH SYSTEMS AND METHODS

CROSS REFERENCE TO RELATED APPLICATIONS

This application claims priority to and the benefit of U.S. Provisional Patent Application No. 63/512,583 filed Jul. 7, 2023 and entitled "VARIABLE BLADE PITCH SYSTEMS AND METHODS," which is incorporated herein by reference in its entirety.

TECHNICAL FIELD

One or more embodiments relate generally to unmanned aerial vehicles (UAVs), and more particularly, for example, to systems and methods directed to controlling a pitch of a rotor blade of a rotary mechanism rotated by a motor, possibly a brushless or brushed electrical motor, and providing vertical lift (as in rotary wing vehicles) and/or horizontal thrust (possibly as an airplane propeller).

BACKGROUND

Unmanned Aerial Vehicles face challenges in the field to operate efficiently with different operational scenarios. One such challenge is the requirement to hover efficiently as well as to be efficient for horizontal forward movement. Efficient operation may depend on the pitch of the UAV rotor blades. Low pitched rotors are more efficient for hovering, and higher pitched rotors are more efficient for horizontal forward movement.

Variable pitch rotors (i.e. rotary devices providing vertical lift in fixed-wing aircraft or propellers providing horizontal thrust) are known and are used to change the lift or horizontal thrust characteristics of a rotor during operation. In fixed-wing aircraft, such rotors typically rely on a swashplate or other actuation system.

In airplanes, various mechanical and hydraulic designs exist to change the pitch of an airplane propeller-such designs date back to before the Second World War. One example from that era is the British Spitfire fighter plane, whose later revisions had dual-pitch adjustable propellers.

One drawback to most multiple- or variable-pitch rotor systems is the complexity of equipment needed to change the blade pitch. Usually, a mechanism driven by a dedicated actuator is used. Other systems require explicit engagement from a pilot or control system. Also, a clutch mechanism is often required to allow the angle to be changed easily while holding the blades in place during regular operation.

Quadcopters may support manual mounting of rotors at a pitch selected as a best pre-flight guess as to the expected flight operational mode, but the pitch cannot be changed in-flight. While some systems do exist to adjust the pitch of a UAV rotor in-flight, these previous systems are implemented with bulky, complex and unreliable electronic pitch adjustment servos.

Therefore, there is a need in the art for systems and methods that address the deficiencies noted above, other deficiencies known in the industry, or at least offers an alternative to current techniques. For example, improvements are needed for an improved rotor blade assembly for rotary-wing and fixed-wing UAVs.

SUMMARY

This section summarizes some embodiments of the invention. Other embodiments are described in subsequent sections. The invention is defined by the appended claims.

Some embodiments disclosed herein perform in-flight pitch changing without requiring a clutch or dedicated actuator. The pitch is changed by a negative burst of the motor torque. In normal operation (constant pitch), the motor torque is transferred to the rotor hub and blades via a ratchet wheel. When a pitch change is needed, the motor abruptly slows down due to the negative torque burst, possibly even reversing the direction of rotation, while blades keep rotating by inertia as allowed by the ratchet mechanism. The ratchet wheel follows the motor due to rigid coupling between the two, and therefore falls behind the blades. In response, the linkage between the ratchet wheel and the blades causes the blades to rotate about their respective longitudinal axes, changing the blade pitch.

In one or more embodiments, a system comprises a ratchet mechanism comprising a ratchet wheel configured to be rotated by a motor about a first axis. The ratchet mechanism comprises one or more followers each of which is coupled to the ratchet wheel. The ratchet wheel rotates the one or more followers in a first direction about the first axis when the ratchet wheel is rotated by the motor in the first direction about the first axis.

The system further comprises one or more rotor blades mounted to rotate about the first axis. Each rotor blade is affixed to a respective follower of the one or more followers. Each follower controls a pitch of the respective rotor blade based on a position of the follower relative to the ratchet wheel.

In one or more embodiments, a method comprises rotating a ratchet wheel by a motor about a first axis. The ratchet wheel is in a fixed position relative to one or more followers rotated about the first axis by the ratchet wheel. The method comprises controlling by each follower a pitch of a respective rotor blade affixed to the follower and rotating about the first axis. The pitch is controlled based on the position of the follower relative to the ratchet wheel.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 10 is a schematic diagram of a rotor system, in accordance with an embodiment of the disclosure.

FIG. 13 is a flowchart of a pitch change operation, in accordance with an embodiment of the disclosure.

FIG. 14 is a flowchart of a process allowing a UAV to determine the pitch of its rotor blades, in accordance with an embodiment of the disclosure.

Figure 1:
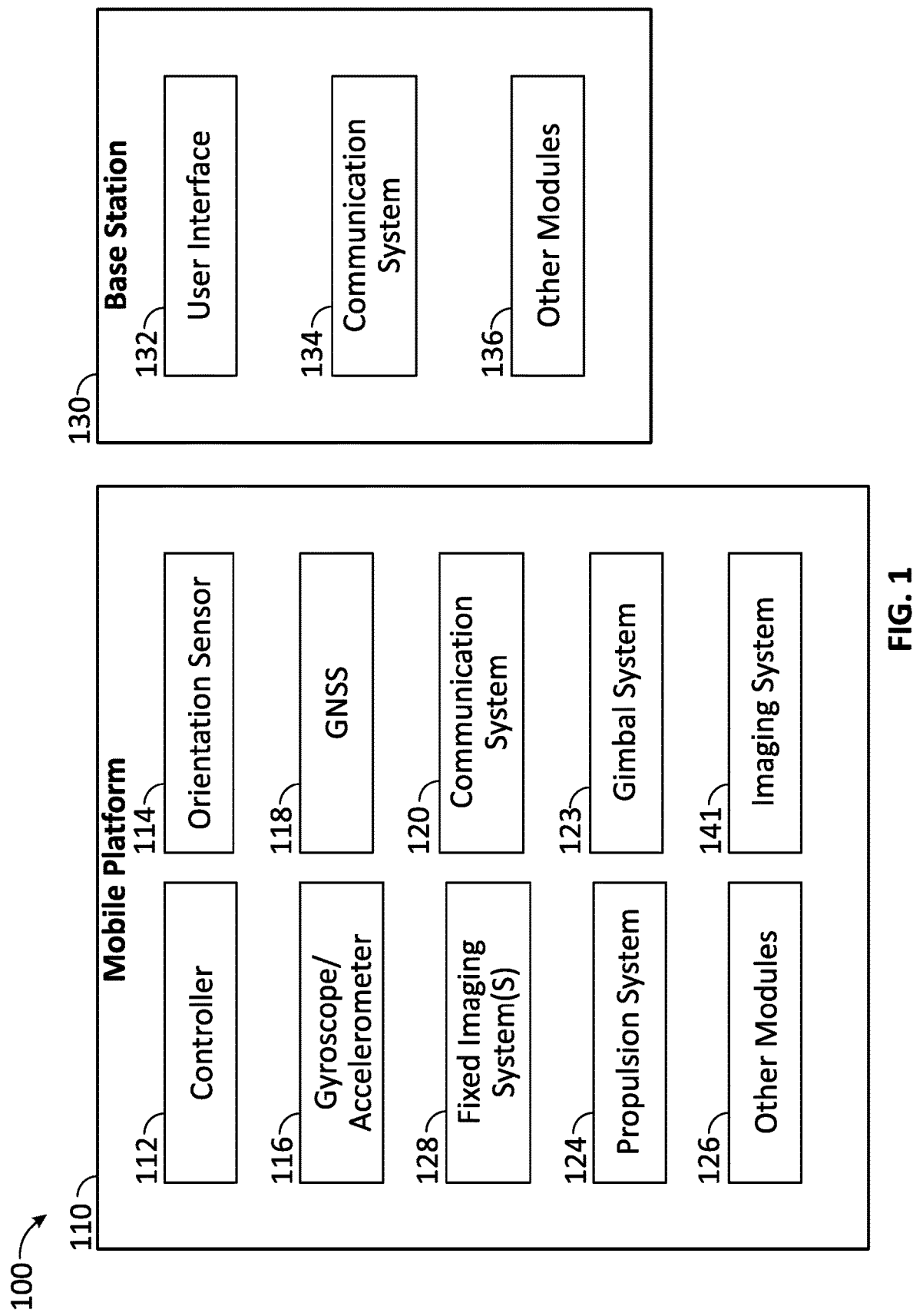
FIG. 1 illustrates a block diagram of a system, in accordance with an embodiment of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Some embodiments disclosed herein allow in-flight pitch change without requiring a clutch or a dedicated actuator. Some embodiments use motor torque to actuate a pitch change. The motor is able to both provide sufficient power to motivate the system creating sufficient lift and/or sufficient forward thrust by the rotor, and to change its torque instantaneously when needed to change the rotor blade pitch. These features are enabled using controller circuitry. The pitch can be changed in-flight in response to a command received from a remote operator or obtained locally from UAV sensor readings or other parameters.

Further, a hovering UAV may need to quickly accelerate horizontally. Some embodiments allow to quickly switch from a hovering rotor blade pitch to a higher pitch, thus improving operational effectiveness of the vehicle.

In some embodiments, the in-flight adjustment of rotor blade pitch is enabled with minimal extra complexity, weight, or hardware.

In some embodiments, actuation of the variable pitch function is performed with a simple and robust mechanism, including a ring (such as ratchet wheel 620 in FIGS. 6-10 discussed below) with a number of detents (e.g. slots 660) of varying depths. The ring forms a cam joint with one or more followers affixed to respective rotor blades. As each follower moves into and out of the slots, the corresponding rotor blade rotates to vary its pitch.

In normal operation with a given pitch, the ring rotates in a "positive" direction to drive the rotor blades. In such operation, the followers are fixed relative to the ring, each follower sitting in a corresponding slot. The pitch is changed by providing a quick reverse pulse ("negative" direction) to the rotor driving torque and hence to the ring, thus dislodging the followers and moving them to slots of a different depth, corresponding to a different pitch.

The pitch control can be implemented in software, and without a secondary servo or solenoid system to effect the desired pitch change.

In some embodiments, the controller determines the current pitch of the rotor by noting the rotational speed and electric current of the rotor driving motor. Hence, no pitch sensor is needed in some embodiments.

The number of available pitch settings can be any number of two or more depending on the number and depth of the slots.

In some embodiments, there are few moving parts, and no additional electronic complexity. The additional weight for the mechanism can be small, e.g. 12 g in some embodiments, and additional vehicle efficiency depending on mission is estimated at 10% for such embodiments.

Some embodiments provide significant improvements in the tradeoffs of flight time, maximum speed, maximum altitude, payload capacity and power consumption for a UAV. While similar benefits may be obtained through other variable-pitch rotor mechanisms, those mechanisms come with higher weight, greater complexity, lower reliability, higher initial cost, higher maintenance requirements and greater manufacturing complexity.

The various rotor blade implementations of the present disclosure may be implemented, for example, as part of a rotor operable to provide vertical lift and/or part of a propeller operable to provide horizontal thrust.

The invention is not limited to the particulars described above or below except as defined by the appended claims.

FIG. 1 illustrates a block diagram of a system 100, in accordance with an embodiment of the disclosure. Referring to FIG. 1, system 100 includes an unmanned aerial vehicle (UAV) 110 and a base station 130, in accordance with one or more embodiments of the disclosure. UAV 110 may be any pilotless aircraft, such as an airplane, helicopter, drone, or other machine capable of flight (e.g., a mobile platform). For example, UAV 110, which may be referred to as a drone or an unmanned aerial system (UAS), may be any pilotless aircraft for military missions, public services, agricultural application, and recreational video and photo capturing, without intent to limit. Depending on the application, UAV 110 may by piloted autonomously (e.g., via onboard computers) or via remote control. UAV 110 may include a fixed-wing, rotorcraft, or quadcopter design, although other configurations are contemplated. As a result, the term "UAV" or "drone" is characterized by function and not by shape or flight technology.

In various embodiments, UAV 110 may be configured to fly over a scene or survey area, to fly through a structure, or to approach a target and image or sense the scene, structure, or target, or portions thereof, via an imaging system 141 (e.g., using a gimbal system 123 to aim imaging system 141 at the scene, structure, or target, or portions thereof, for example). Resulting imagery and/or other sensor data may be processed (e.g., by controller 112) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of UAV 110 and/or imaging system 141, such as controlling gimbal system 123 to aim imaging system 141 towards a particular direction, or controlling propulsion system 124 to move UAV 110 to a desired position in a scene or structure or relative to a target.

UAV 110 may be implemented as a mobile platform configured to move or fly and position and/or aim imaging system 141 (e.g., relative to a selected, designated, or detected target). As shown in FIG. 1, UAV 110 may include one or more of a controller 112, an orientation sensor 114, a gyroscope/accelerometer 116, a global navigation satellite system (GNSS) 118, a communication system 120, a gimbal system 123, a propulsion system 124, and other modules 126. Operation of UAV 110 may be substantially autonomous and/or partially or completely controlled by base station 130, which may include one or more of a user interface 132, a communication system 134, and other modules 136. In other embodiments, UAV 110 may include one or more of the elements of base station 130, such as with various types of manned aircraft, terrestrial vehicles, and/or surface or subsurface watercraft. Imaging system 141 may be physically coupled to UAV 110 via gimbal system 123 and may be configured to capture sensor data (e.g., visible spectrum images, infrared images, narrow aperture radar data, and/or other sensor data) of a target position, area, and/or object(s) as selected and/or framed by operation of UAV 110 and/or base station 130.

Controller 112 may be implemented as any appropriate logic circuit and/or device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 110 and/or other elements of system 100, such as gimbal system 123, imaging system 141, fixed imaging systems 128, or the propulsion system 124, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein.

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of UAV 110 such as gimbal system 123, imaging system 141, and fixed imaging system(s) 128, for example.

In some embodiments, controller 112 may be configured to substantially continuously monitor and/or store the status of and/or sensor data provided by one or more elements of UAV 110, gimbal system 123, imaging system 141, fixed imaging system(s) 128, and/or base station 130, such as the position and/or orientation of UAV 110, gimbal system 123, imaging system 141, and/or base station 130, for example.

Orientation sensor 114 may be implemented as one or more of a compass, float, accelerometer, and/or other device capable of measuring an orientation of UAV 110 (e.g., magnitude and direction of roll, pitch, and/or yaw, relative to one or more reference orientations such as gravity and/or Magnetic North), gimbal system 123, fixed imaging system(s) 128, and/or other elements of system 100, and providing such measurements as sensor signals and/or data that may be communicated to various devices of system 100.

Gyroscope/accelerometer 116 may be implemented as one or more inertial measurement units (IMUs), electronic sextants, semiconductor devices, integrated chips, accelerometer sensors, accelerometer sensor systems, or other devices capable of measuring angular velocities/accelerations and/or linear accelerations (e.g., direction and magnitude) of UAV 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of UAV 110 (e.g., or an element of UAV 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100 and other nodes participating in a mesh network. In some embodiments, GNSS 118 may include an altimeter, for example, or may be used to provide an absolute altitude.

Communication system 120 may be implemented as any wired and/or wireless communication system configured to transmit and receive analog and/or digital signals between elements of system 100 and other nodes participating in a mesh network or some other network type. For example, communication system 120 may be configured to receive flight control signals and/or data from base station 130 and provide them to controller 112 and/or propulsion system 124. In other embodiments, communication system 120 may be configured to receive images and/or other sensor information (e.g., visible spectrum and/or infrared still images or video images) from fixed imaging system(s) 128 and/or imaging system 141 and relay the sensor data to controller 112 and/or base station 130. In some embodiments, communication system 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications. Communication links established by communication system 120 may be configured to transmit data between elements of system 100 substantially continuously throughout operation of system 100, where such data includes various types of sensor data, control parameters, and/or other data, as described herein.

Gimbal system 123 may be implemented as an actuated gimbal mount, for example, that may be controlled by controller 112 to stabilize and direct imaging system 141 relative to a target or to aim imaging system 141 according to a desired direction and/or relative orientation or position. For example, controller 112 may receive a control signal from one or more components of system 100 to cause gimbal system 123 to adjust a position of imaging system 141 as described in the disclosure. As such, gimbal system 123 may be configured to provide a relative orientation of imaging system 141 (e.g., relative to an orientation of UAV 110) to controller 112 and/or communication system 120 (e.g., gimbal system 123 may include its own orientation sensor 114). In other embodiments, gimbal system 123 may be implemented as a gravity driven mount (e.g., non-actuated). In various embodiments, gimbal system 123 may be configured to provide power, support wired communications, and/or otherwise facilitate operation of articulated sensor/imaging system 141. In further embodiments, gimbal system 123 may be configured to couple to a laser pointer, range finder, and/or other device, for example, to support, stabilize, power, and/or aim multiple devices (e.g., imaging system 141 and one or more other devices) substantially simultaneously.

In some embodiments, gimbal system 123 may be adapted to rotate imaging system 141+−90 degrees, or up to 360 degrees, in a vertical plane relative to an orientation and/or position of UAV 110. In further embodiments, gimbal system 123 may rotate imaging system 141 to be parallel to a longitudinal axis or a lateral axis of UAV 110 as UAV 110 yaws, which may provide 360 degree ranging and/or imaging in a horizontal plane relative to UAV 110. In various embodiments, controller 112 may be configured to monitor an orientation of gimbal system 123 and/or imaging system 141 relative to UAV 110, for example, or an absolute or relative orientation of an element of imaging system 141 (e.g., a sensor of imaging system 141). Such orientation data may be transmitted to other elements of system 100 for monitoring, storage, or further processing, as described herein.

Propulsion system 124 may be implemented as one or more rotors, turbines, or other thrust-based propulsion systems, and/or other types of propulsion systems that can be used to provide motive force and/or lift to UAV 110 and/or to steer UAV 110. In some embodiments, propulsion system 124 may include multiple rotors (e.g., a tri, quad, hex, oct, or other type "copter") that can be controlled (e.g., by controller 112) to provide lift and motion for UAV 110 and to provide an orientation for UAV 110. In other embodiments, propulsion system 124 may be configured primarily to provide thrust while other structures of UAV 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Fixed imaging system(s) 128 may be implemented as an imaging device fixed to the body of UAV 110 such that a position and orientation is fixed relative to the body of the mobile platform, according in various embodiments. Fixed imaging system(s) 128 may include one or more imaging modules, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array.

In various embodiments, an imaging module of a fixed imaging system 128 may include one or more logic devices that can be configured to process imagery captured by detector elements of the imaging module before providing the imagery to controller 112. Fixed imaging system(s) 128 may be arranged on the UAV 110 and configured to perform any of the operations or methods described herein, at least in part, or in combination with controller 112 and/or user interface 132. An example fixed imaging system(s) 128 configuration includes using 6 fixed imaging systems, each covering a 90-degree sector to give complete 360-degree coverage. Using on-chip down-sampling of the images provided by fixed imaging system(s) 128 to approximately the order of 128×128 pixels and recording at 1200 Hz, the fixed imaging system(s) 128 can track rotations of 1000-1500 degrees per second with an optical flow of less than one pixel per frame. The same one-pixel optical flow per frame criteria would be fulfilled when flying UAV 110 at speeds in excess of 10 m/s at 1 m distance from the surface (e.g., wall, ground, roof, etc.). When not sampling at high rates, these low-resolution fixed imaging system(s) 128 may consume little power and thus minimally impact an average power consumption for UAV 110. Thus, a motion-dependent frame rate adjustment may be used to operate efficiently where the frame rate can be kept high enough to maintain the one pixel optical-flow per the frame tracking criteria.

Other modules 126 may include other and/or additional sensors, actuators, communications modules/nodes, and/or user interface devices, for example, and may be used to provide additional environmental information related to operation of UAV 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of UAV 110 and/or system 100.

In some embodiments, other modules 126 may include one or more actuated and/or articulated devices (e.g., multispectrum active illuminators, visible and/or IR cameras, radars, sonars, and/or other actuated devices) coupled to UAV 110, where each actuated device includes one or more actuators adapted to adjust an orientation of the device, relative to UAV 110, in response to one or more control signals (e.g., provided by controller 112). Other modules 126 may include a stereo vision system configured to provide image data that may be used to calculate or estimate a position of UAV 110, for example, or to calculate or estimate a relative position of a navigational hazard in proximity to UAV 110. In various embodiments, controller 112 may be configured to use such proximity and/or position information to help safely pilot UAV 110 and/or monitor communication link quality with the base station 130.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communication system 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In some embodiments, user interface 132 may be adapted to accept user input including a user-defined target heading, waypoint, route, and/or orientation for an element of system 100, for example, and to generate control signals to cause UAV 110 to move according to the target heading, route, and/or orientation, or to aim imaging system 141. In other embodiments, user interface 132 may be adapted to accept user input modifying a control loop parameter of controller 112, for example. In further embodiments, user interface 132 may be adapted to accept user input including a user-defined target attitude, orientation, and/or position for an actuated or articulated device (e.g., imaging system 141) associated with UAV 110, for example, and to generate control signals for adjusting an orientation and/or position of the actuated device according to the target altitude, orientation, and/or position. Such control signals may be transmitted to controller 112 (e.g., using communication system 134 and 120), which may then control UAV 110 accordingly.

Communication system 134 may be implemented as any wired and/or wireless communication system configured to transmit and receive analog and/or digital signals between elements of system 100 and/or nodes participating in a mesh network. For example, communication system 134 may be configured to transmit flight control signals or commands from user interface 132 to communication systems 120 or 144. In other embodiments, communication system 134 may be configured to receive sensor data (e.g., visible spectrum and/or infrared still images or video images, or other sensor data) from UAV 110. In some embodiments, communication system 134 may be configured to support spread spectrum transmissions, for example, and/or multiple simultaneous communications channels between elements of system 100. In various embodiments, communication system 134 may be configured to monitor the status of a communication link established between base station 130, UAV 110, and/or the nodes participating in the mesh network (e.g., including packet loss of transmitted and received data between elements of system 100 or the nodes of the mesh network, such as with digital communication links). Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of UAV 110 and/or system 100 or to process sensor data to compensate for environmental conditions, such as an water content in the atmosphere approximately at the same altitude and/or within the same area as UAV 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100. In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, Cursor-on-Target (CoT) or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices. In some embodiments, one or more of the devices may be powered by a power source for UAV 110, using one or more power leads. Such power leads may also be used to support one or more communication techniques between elements of system 100.

Figure 2A:
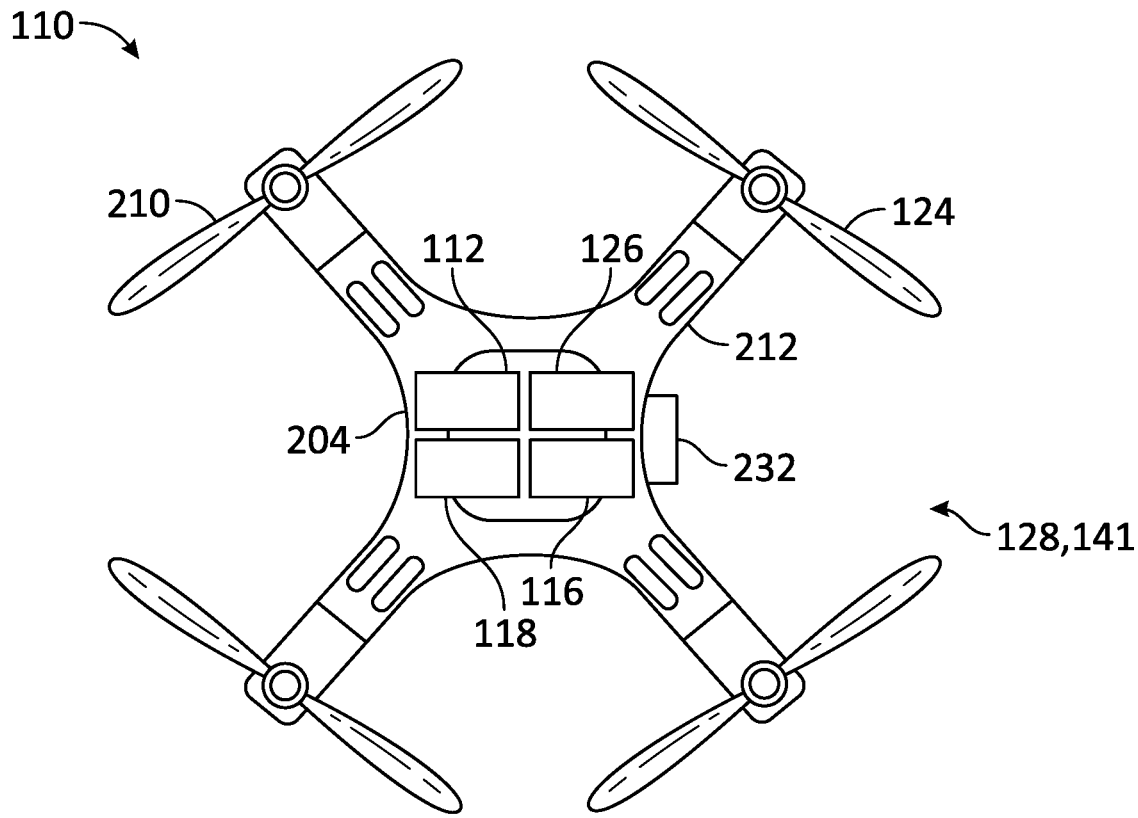
FIG. 2A illustrates a diagram of a UAV, in accordance with an embodiment of the disclosure.

FIG. 2A illustrates a diagram of UAV 110. Referring to FIG. 2A, UAV 110 may include a body 204 and propulsion system 124. Propulsion system 124 may be configured to propel UAV 110 for flight. For example, propulsion system 124 may include one or more rotors 210 connected to body 204, such as via respective arms or wings 212 extending from body 204. Depending on the application, rotors 210 may have a fixed orientation, or rotors 210 may move, to provide a desired flight characteristic. Operation of propulsion system 124 may be substantially autonomous and/or partially or completely controlled by a remote system (e.g., a remote control, a tablet, a smartphone, base station 130, etc.).

Body 204 may be equipped with controller 112 that may include one or more logic devices. Each logic device, which may be referred to as an on-board computer or processor, may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 110 and/or other elements of a system, for example. Such software instructions may implement methods for processing images and/or other sensor signals, determining sensor information, providing user feedback, querying devices for operational parameters, selecting operational parameters for devices, or performing any of the various operations described herein (e.g., operations performed by one or more devices of UAV 110).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of UAV 110. For example, controller 112 may be adapted to store sensor signals, sensor information, and/or operational parameters, over time, for example, and provide such stored data to a user. In some embodiments, controller 112 may be integrated with one or more other elements of UAV 110, for example, or distributed as multiple logic devices within UAV 110.

Controller 112 may be configured to perform a set of operations. For example, controller 112 may be configured for flight control and position estimation, among other operations. For position estimation, UAV 110 may be equipped with GNSS 118 and/or gyroscope/accelerometer 116 to provide position measurements. For example, GNSS 118 and/or gyroscope/accelerometer 116 may provide frequent measurements to controller 112 for position estimation. In embodiments, controller 112 may be configured for video/image processing and communication. Specifically, controller 112 may process one or more images captured by one or more cameras of UAV 110, as described below. Although specific flight module and imagery module capabilities are described with reference to controller 112, respectively, the flight module and imagery module may be embodied as separate modules of a single logic device or performed collectively on multiple logic devices.

In embodiments, UAV 110 may include other modules, such as other and/or additional sensors, actuators, communications modules/nodes, and/or user interface devices used to provide additional operational and/or environmental information, for example. In some embodiments, other modules may include navigational or environmental sensors providing measurements and/or other sensor signals that can be displayed to a user and/or used to provide operational control of UAV 110, as described herein. In various embodiments, other modules may include a power supply implemented as any power storage device configured to provide enough power to each element of UAV 110 to keep all such elements active and operable.

Figure 2B:
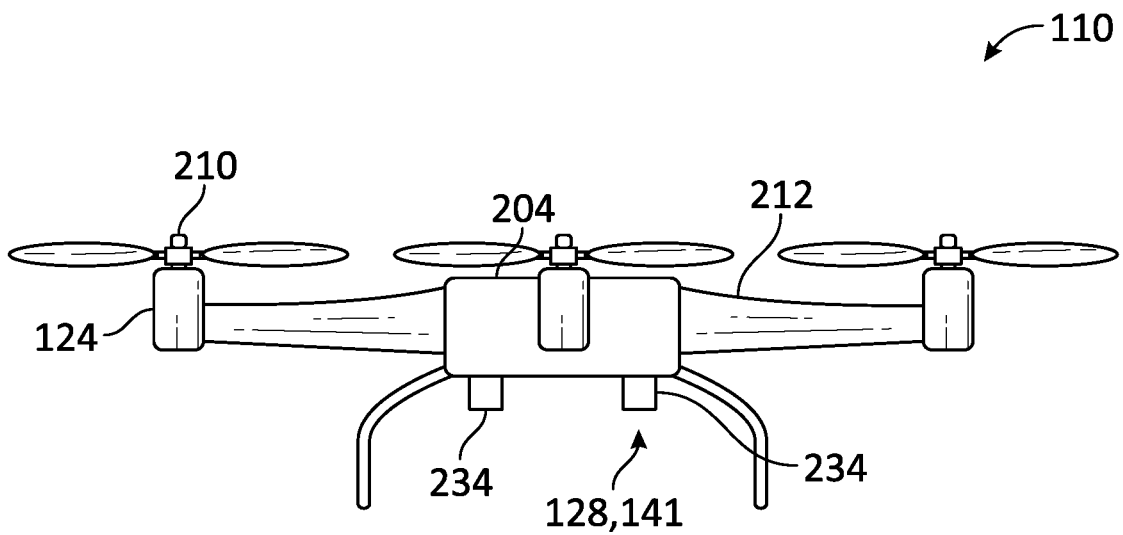
FIG. 2B illustrates another diagram of the UAV, in accordance with an embodiment of the disclosure.

FIG. 2B illustrates a diagram of a side view of UAV 110, in accordance with an embodiment of the disclosure. Referring to FIGS. 2A-2B, UAV 110 may include one or more cameras, such as several cameras (e.g., pointing in same or different directions). For example, fixed imaging system(s) 128 and/or imaging system 141 may include a front camera 232 pointing in the direction of travel. In embodiments, front camera 232 may be fixed or connected to gimbal system 123 to aim front camera 232 as desired. Referring to FIG. 2B, fixed imaging system(s) 128 and/or imaging system 141 may include one or more navigation cameras 234 pointing down and to the sides of body 204. Navigation cameras 234 may be fixed or connected to gimbal system 123 to aim navigation cameras 234 as desired. Navigation cameras 234 may support position estimation of UAV 110, such as when GPS data is inaccurate, GNSS 118 is inoperable or not functioning properly, etc. For example, images from navigation cameras 234 (and/or front camera 232) may be provided to controller 112 for analysis (e.g., position estimation).

Front camera 232 and/or navigation cameras 234 may be configured to capture one or more images (e.g., visible and/or non-visible images), such as a stream of images. For example, front camera 232 and/or navigation cameras 234 may be configured to capture visible, infrared, and/or thermal infrared images, among others. Each camera may include an array of sensors (e.g., a multi-sensor suite) for capturing thermal images (e.g., thermal image frames) in response to infrared radiation. In embodiments, front camera 232 and/or navigation cameras 234 may capture short-wave infrared (SWIR) light (e.g., 1-2 µm wavelengths), mid-wave infrared (MWIR) light (e.g., 3-5 µm wavelengths), and/or long-wave infrared (LWIR) light (e.g., 8-15 µm wavelengths). In embodiments, front camera 232 and/or navigation cameras 234 may capture visible and infrared fused images. For instance, both a visible and a thermal representation of a scene (e.g., a search area) may be captured and/or presented to the pilot or another user of the system.

Figure 3:
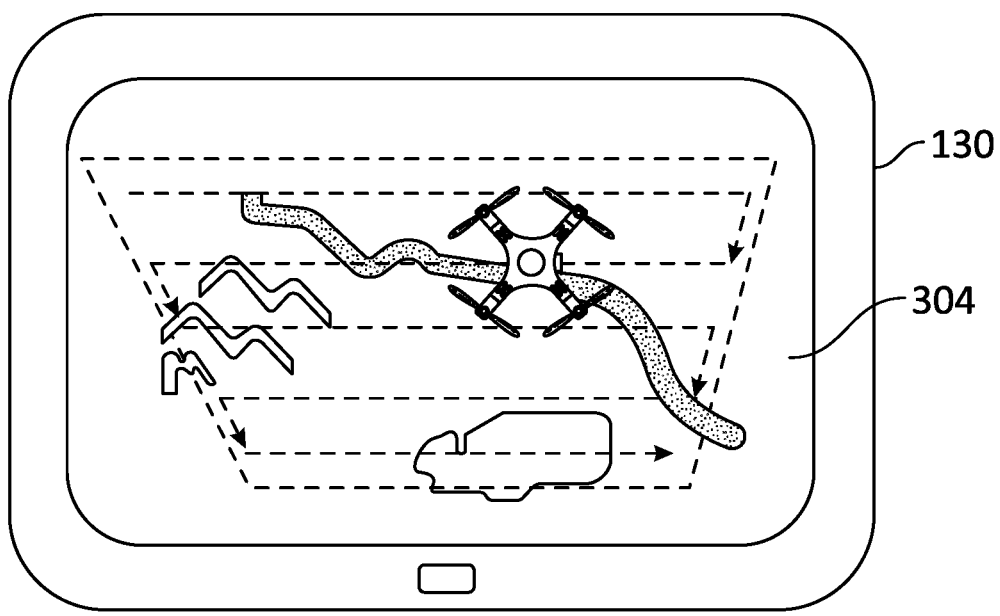
FIG. 3 illustrates a diagram of a base station or controller, in accordance with an embodiment of the disclosure.

FIG. 3 illustrates a diagram of base station 130, in accordance with an embodiment of the disclosure. Base station 130 may be implemented as one or more of a tablet, a display, a touch screen, a keyboard, a mouse, a joystick, a knob, a steering wheel, and/or any other device capable of accepting user input and/or providing feedback to a user. In various embodiments, base station 130 may provide a user interface 304 (e.g., a graphical user interface) adapted to receive user input. Base station 130 may be implemented with one or more logic devices that may be adapted to store and/or execute instructions, such as software instructions, implementing any of the various processes and/or methods described herein. For example, base station 130 may be adapted to form communication links, transmit and/or receive communications (e.g., sensor signals, control signals, sensor information, user input, and/or other information), for example, or to perform various other processes and/or methods described herein The pilot may have control of UAV 110 and access to UAV data using base station 130. For example, base station 130 may be connected to UAV 110 using a wireless link, such as a wireless link having enough bandwidth for video and data transmission. Base station 130 may include an image panel and an input panel. In embodiments, user interface 304 may function as both the image panel and the input panel. The image panel may be used to view image/video feeds from one or more cameras on-board UAV 110, such as front camera 232 and/or navigation cameras 234. The input panel may be configured to receive user input, such as via the user's finger, a stylus, etc. For example, input panel may allow the pilot to configure different UAV and/or search settings. In embodiments, base station 130 may provide a map for the pilot to locate UAV 110 during flight. In some embodiments, one or more accessories may be connected to the base station 130, such as a joystick for better flight control of UAV 110. As shown, the base station 130 may be a tablet, although other configurations are contemplated.

Figure 4:
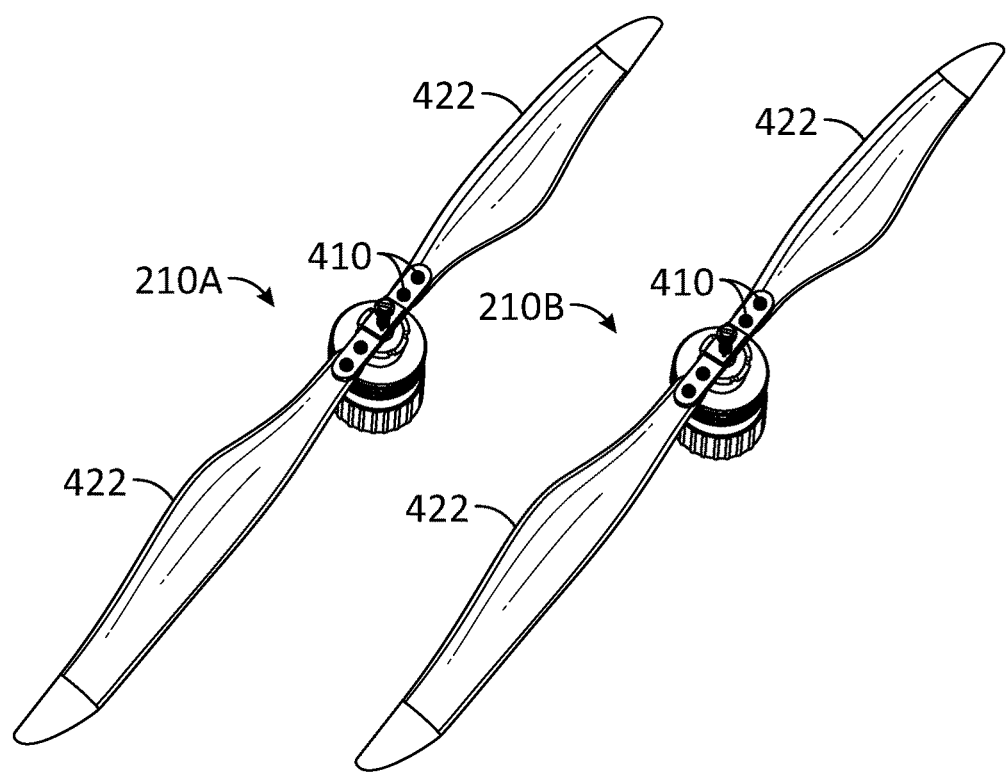
FIG. 4 is a perspective view of a fixed rotor system and a foldable rotor system, in accordance with an embodiment of the disclosure.
Figure 5:
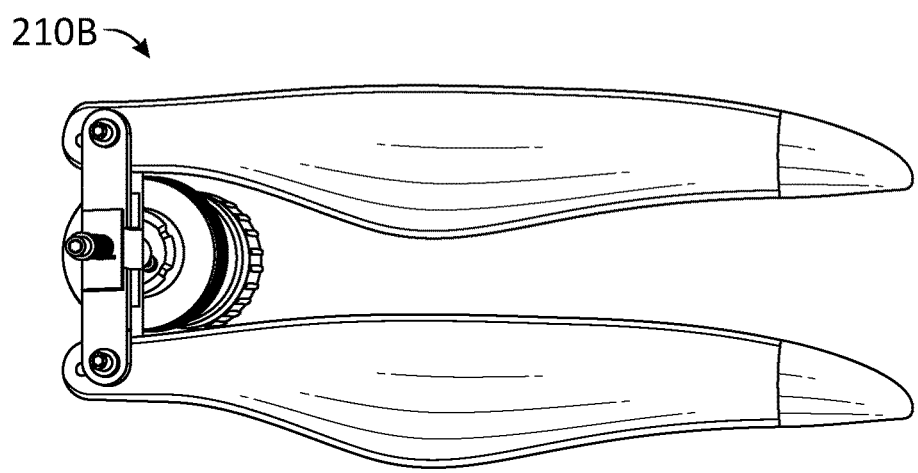
FIG. 5 is a perspective view of a foldable rotor system with folded rotor blades, in accordance with an embodiment of the disclosure.

FIG. 4 is a perspective view of two rotor systems 210, marked 210A and 210B, each having two rotor blades 422, according to some embodiments of the present disclosure. Rotor system 210A is a fixed rotor system, with each rotor blade 422 being attached using two fasteners 410, e.g. screws. Rotor system 210B is a foldable rotor system, shown folded in FIG. 5. The features described herein are applicable to both fixed and foldable rotor systems unless stated otherwise.

Figure 6:
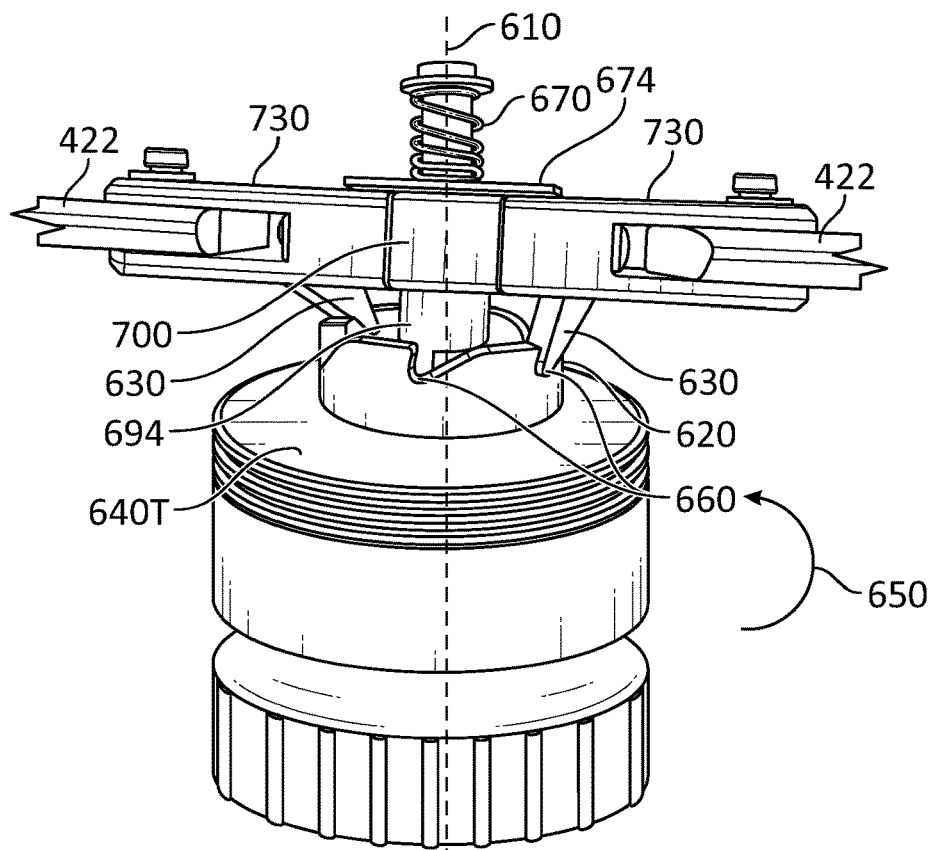
FIGS. 6, 7, and 8 are perspective views of a rotor system to illustrate respective different blade pitch settings, in accordance with an embodiment of the disclosure.
Figure 7:
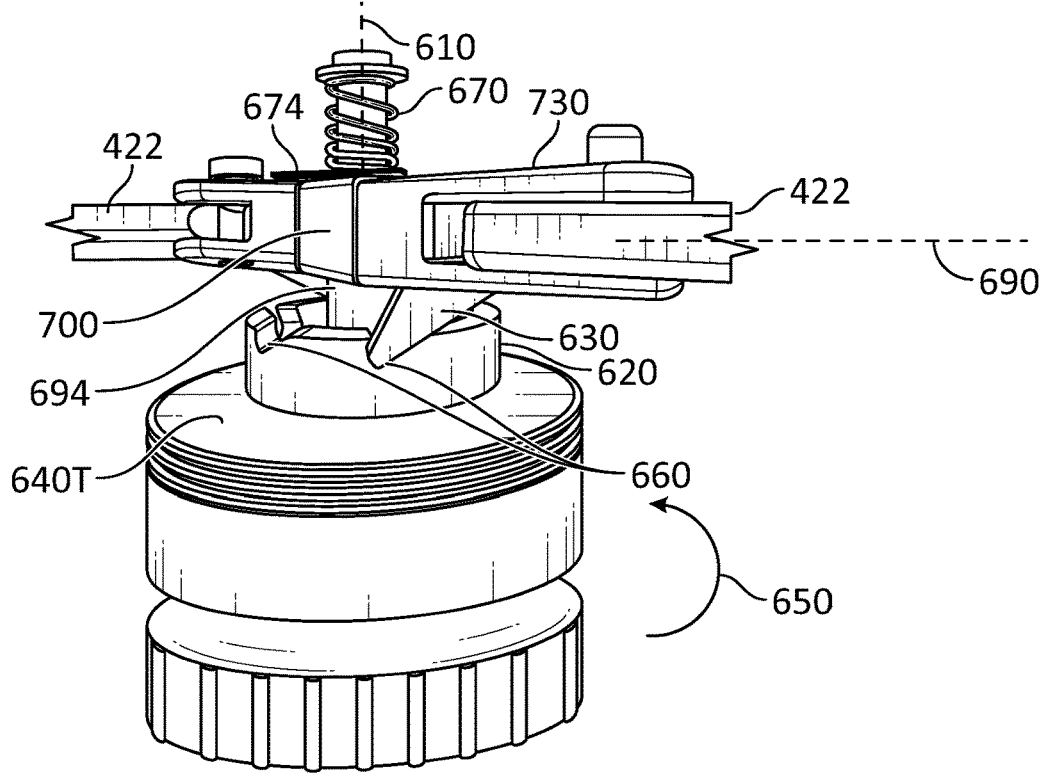
Figure 8:
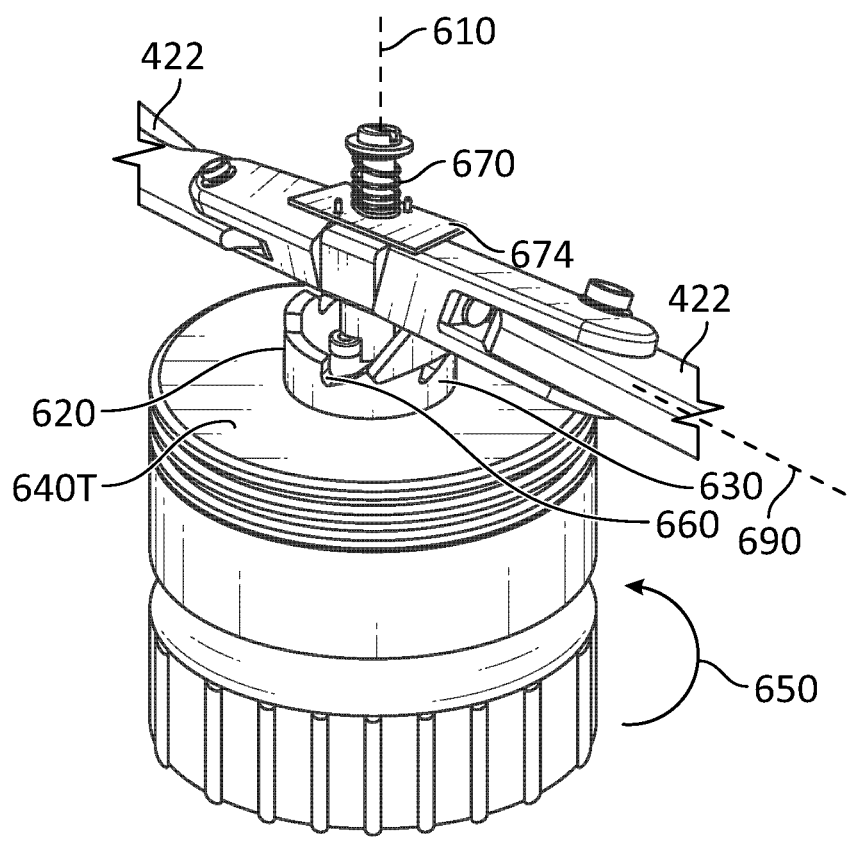
Figure 9:
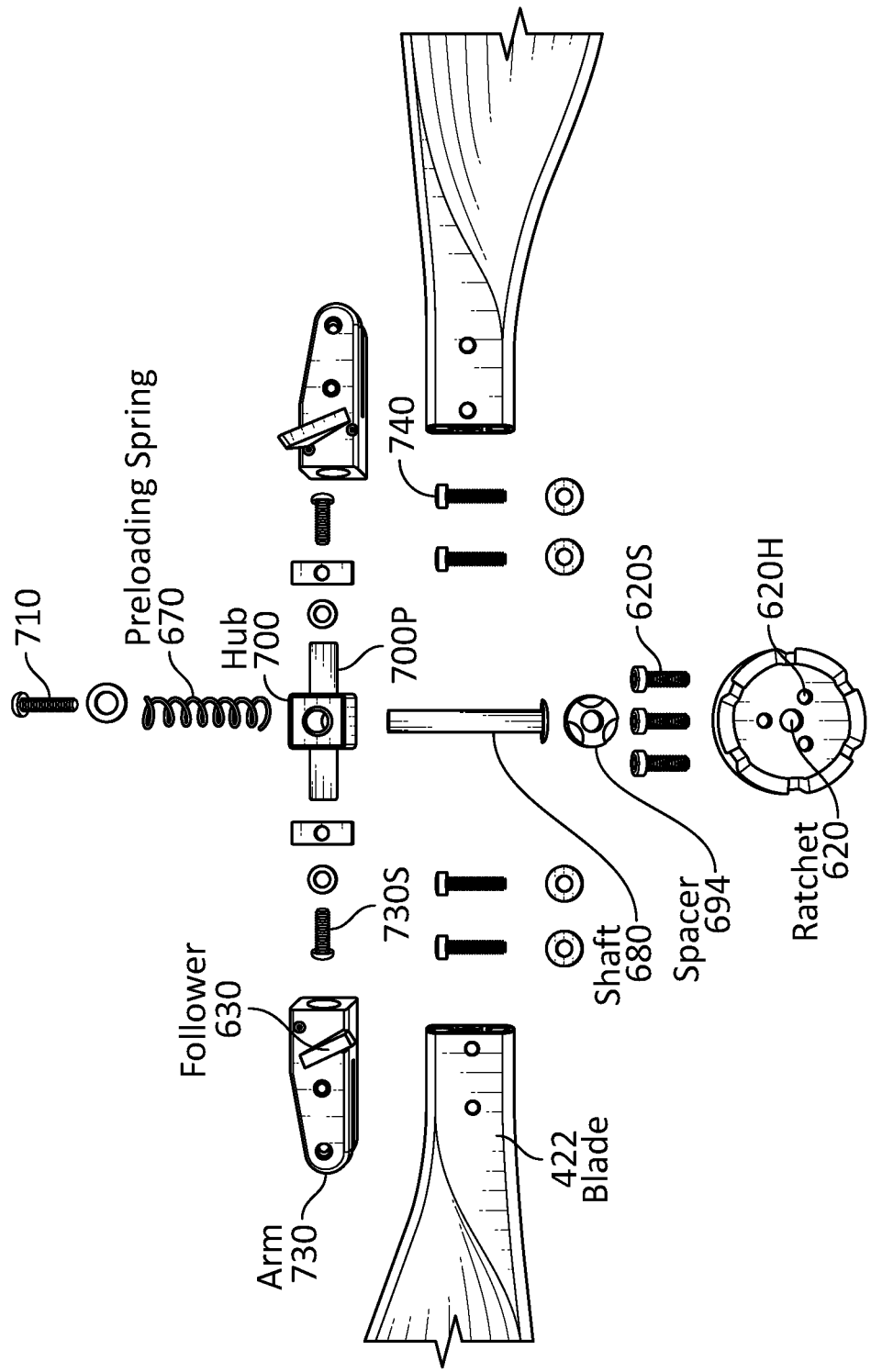
FIG. 9 shows rotor assembly parts, in accordance with an embodiment of the disclosure.
Figure 12:
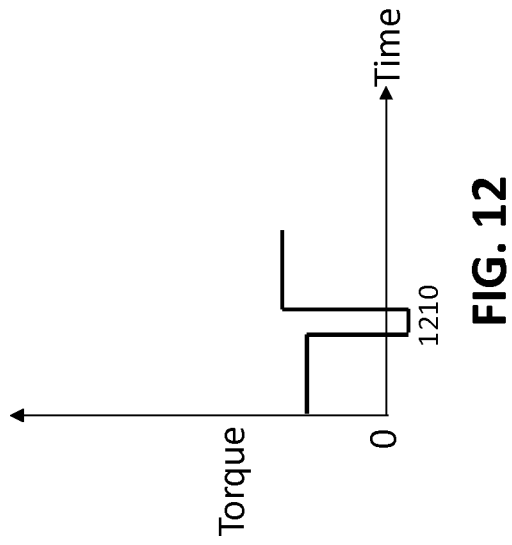
FIG. 12 is a graph of motor torque versus time in a pitch change operation, in accordance with an embodiment of the disclosure.
Figure 11B:
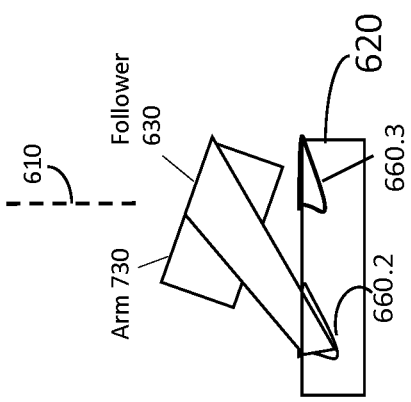
FIGS. 11A and 11B are side views of a rotor system at respective different pitches, in accordance with an embodiment of the disclosure.
Figure 11A:
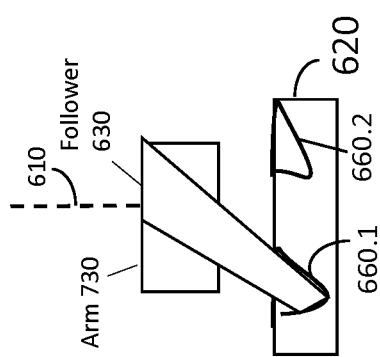

FIGS. 6, 7, and 8 are perspective views of a rotor system 210 that illustrate different blade pitches. FIG. 9 shows rotor assembly parts in system 210. FIG. 10 is a schematic diagram of rotor system 210. FIGS. 11A and 11B are side views at different pitch settings. FIG. 12 is a graph of motor torque versus time in a pitch change operation.

Specific rotor system 210 shown in FIGS. 4-10 is a two-blade, three-pitch system, but any number of blades and pitches are possible. Rotor 210 rotates about main axis 610. Ratchet wheel 620 forms a cam joint with each follower 630. Each followers 630 is affixed to the corresponding rotor blade 422 to define the blade pitch. Each follower 630 actuates a pitch change of the corresponding blade 422 through a short negative-torque burst 1210 (FIG. 12) from motor 640, without the need for any additional motors or actuator mechanisms. In the example of FIGS. 6-10, the "negative torque" direction is clockwise when viewed from above the rotor; the "positive" direction is counterclockwise, and is shown by arrow 650.

In the particular example of FIG. 12, the torque becomes negative during burst 1210, but in other examples, the torque remains positive or at least zero but has a negative ripple, i.e. decreases briefly. In either case, the negative torque burst 1210 causes the followers 630 to move from one ratchet wheel detent 660 into another due to inertia of rotor 210. Each follower 630 has a bottom end pressed against the top surface of ratchet wheel 620 by spring 670. Each follower 630 is affixed to the corresponding blade 422 so that the up-and-down motion of the bottom end of follower 630 (the motion in and out of detents 660) is transmitted to rotate the blade 422 about the blade's longitudinal axis 690. Different detents 660 may have different depths (the depths are measured relative to a plane of rotation of the rotor assembly about the main axis 610, and can be measured relative to any given plane perpendicular to main axis 610). FIGS. 11 and 11B illustrate three consecutive detents 660.1, 660.2, 660.3 of different depths. Due to different depths, different detents 660 correspond to different blade pitch values. When the brief negative torque burst 1210 ends and the motor 640 resumes providing positive torque driving the rotor, the ratchet mechanism prevents the blade 422 from moving back to the previous blade pitch.

Some implementations are backward-compatible with fixed pitch rotor assemblies, and can be retrofitted to change a fixed pitch rotor assembly to a variable pitch assembly, as the mechanism is fully contained in the rotor and motor assembly, and only a software change is needed in the control system 112 to provide the negative torque ripple 1210 when the blade pitch change is desired.

Spring 670 presses down on the rotor blade assembly via a rigid plate 674 (e.g. metal) to ensure that each follower 630 remains engaged in the same slot 660 during positive torque operation. The ratchet wheel 620 is affixed to motor shaft 680 to convey the motor torque to the rotor assembly. In some embodiments, this is the only aspect of the assembly which conveys the torque from the motor to each blade 422. The positive torque from the motor presses each follower 630 into the corresponding ratchet detent 660.

When a negative torque burst 1210 is applied to motor 640, each follower 630 briefly slips out of the corresponding ratchet detent 660 by overcoming the downward pressure of spring 670. Negative torque burst 1210 is just long enough to allow each follower 630 to move to the next detent 660, whereupon the negative torque burst 1210 ends, positive torque is resumed, and each follower 630 is thereby (from the positive torque and the force of the spring 670) seated in the new detent 660.

In other embodiments, torque burst 1210 is long enough to allow each follower 630 to slide over the next detent 660 into the following detent 660 or a subsequent detent.

In some embodiments, detents 660 are arranged in pairs of the same depth such that both blades 422 are at the same pitch. Each pair includes detents that are diametrically opposite to each other and are rotationally symmetric about the main axis 610 with the symmetry angle of 180°. For three pitch settings, there are three pairs of detents 610. In some embodiments, starting at the shallowest pair 660, the consecutive pairs may be at progressively increasing depths when traced in the positive direction 650.

These particulars, and other specifics disclosed herein, are not limiting except as defined by the appended claims. For example, if the rotor assembly has three blades 422, the detents can be grouped in triples of the same depth to ensure that the three blades are at the same pitch. Each detent triple can be rotationally symmetric with the symmetry angle of 120°. Other configurations are possible.

FIG. 9 shows the physical elements for one implementation, clearly illustrating that this can be a low-cost, low-weight, low-complexity system.

Motor shaft 680 (FIG. 10) passes from below through a central axial hole in ratchet wheel 620, then through a central axial hole in spacer 694, then through a central axial hole in hub 700, a central axial hole in plate 674, and then through spring 670. Hub 700 and plate 674 can freely slide up and down shaft 680 and rotate about the shaft as in a slip joint, allowing the shaft to rotate relative to the hub during negative-torque bursts 1210. Pins (not shown) may be provided that pass through plate 674 and are fixed to hub 700, to allow the plate 674 to slide up and down the pins and the shaft 680 relative to hub 700. The upward motion of plate 674 relative to hub 700 can accommodate rotation of arms 730 relative to hub 700. The up/down motion of hub 700 and plate 674 is restrained by spring 670 compressed by the head of screw 710 and a washer and biasing the plate 674 toward the ratchet wheel. Screw 710 is threaded from the top into an axial bore (not shown) in motor shaft 680. Spacer 694 can be affixed to ratchet wheel 620.

Ratchet wheel 620 has three holes 620H (FIG. 9) used for screws 620S to affix the ratchet wheel 620 to the top surface 640T of the head of motor 640. The top surface 640T and shaft 680 are fixedly interconnected to rotate together at the same velocity at all times. Spacer 694 provides a fixed gap between hub 700 and ratchet wheel 620.

Hub 700 has radial pins 700P inserted into radial holes of respective arms 730 to form revolute joints. Screws 730S are threaded through the radial holes in respective arms 730 into respective hub pins 700P to prevent any motion of the pins and arms relative to each other except for rotational motion about blade axis 690.

Each rotor blade 422 is affixed to respective arm 730 by one or more fasteners 740, e.g. screws each of which passes vertically through an arm 730 and respective blade 422. Each pair of arm 730 and blade 422 is rotatable about axis 690.

Each follower 630 has a top surface fixed within the corresponding arm 730. See FIGS. 11A and 11B showing a follower 630 extending from the corresponding arm 730 into a detent 660; the detent is deeper in FIG. 11A than FIG. 11B. When the bottom end of follower 630 moves up and down, the corresponding arm 730 rotates to change the pitch of the corresponding blade 422.

Many variations are possible. For example, screws can be replaced by other types of fasteners. The invention is not limited to specific parts or joints; the number of rotors 210 or blades 422 in each rotor; the pitch values; or other particulars. The invention is applicable to helicopters, airplanes, VTOL (Virtual Take-Off and Landing) vehicles, or any kind of propeller/rotor arrangements, including for example to a UAV including a combination of rotors providing a vertical lift and propellers providing a horizontal thrust. Any of these rotors/propellers may include zero or more fixed pitch blades in combination with one or more variable pitch blades constructed as described above in connection with FIGS. 4-12. Further, a rotor 210 may include both fixed and variable pitch blades 422.

An exemplary embodiment is a quadcopter having four variable pitch rotors 210 constructed as described above in connection with FIGS. 4-12 and having the following parameters. The blades have three settings of geometric pitch H, defined as the axial distance that a rotor would travel in solid media in one turn. The geometric pitch H and the rotor diameter D define relative pitch h=H/D. In the exemplary quadcopter embodiment, the relative pitch values are:

h=0.4, with blades 422 being at 7.8° pitch angle;
h=0.5, with blades 422 being at 10.50 pitch angle;
h=0.6, with blades 422 being at 130 pitch angle.

UAV energy efficiency in hover can be evaluated using the Figure Of Merit (FOM), which is a measure of lift performance per Watt of power applied, giving a metric similar to efficiency. In the embodiment being described, in hovering, a low-pitch blade (h=0.4) may achieve a FOM measure that is 75% greater than the high-pitch blade (h=0.6) at the same engine speed. This means that a significant energy savings may be realized by switching from high pitch to low pitch while hovering.

In contrast, in freestream flight of the same quadcopter, when evaluating the blade efficiency as the peak forward performance efficiency n, the high-pitch blade (h=0.6) can be significantly more efficient than the low-pitch blade (h=0.4). Moreover, the higher peak efficiency is achieved at a faster airspeed. This means that not only can this vehicle move forward more efficiently with a high-pitch blade, but it can also achieve that higher efficiency at a higher airspeed.

These two use-cases highlight that in some embodiments, a lower-pitch blade may be preferred for hovering, while a higher-pitch blade may be preferred for forward travel. Intermediate pitch settings, such as h=0.5 in the example above, may be suitable for hovering at high altitudes.

FIG. 13 illustrates a pitch change operation according to some embodiments. At step 1310, controller 112 obtains a command requiring a pitch change. The controller may receive the command from base station 130 or another source via communication system 120. Alternatively, the command may be generated by UAV 100 internally based on the current flight conditions, available fuel, or other factors. The command may specify the desired pitch or change of pitch, or may specify flying conditions (e.g. hovering vs. forward flight) from which the controller may calculate the desired pitch. Other command sources are also possible.

If the UAV has multiple variable-pitch rotors 210, the command may relate to all the rotors 210 or specify those rotors for which the pitch change is needed.

At step 1320, the controller causes the motor to generate one or more negative torque bursts 1210 for the motor(s) 640 of the affected rotors 210 to change the pitch as required by the command. The negative torque burst durations and torque values may be preset in advance, or may be calculated by the controller taking into account the current pitch value and the desired pitch value and/or environmental conditions such as air density and wind strength and direction. If the command pertains to multiple rotors, the controller may change the pitch in all or some of the affected rotors simultaneously, and may stagger the pitch change operations by changing the pitch of one or more but less than all affected rotors at a time.

It may also be desirable for controller 112 to be able to determine the current pitch in each rotor system 210. A request for the current pitch may be generated internally within the UAV or received by the controller from a remote location, e.g. base station 130. In some embodiments, the UAV does not have a pitch sensor, and the pitch is determined by controller 112 as shown in FIG. 14.

At step 1410, controller 112 obtains the speed (RPM) and electric current through motor 640 (assuming that motor 640 is an electric motor). For example, the motor RPM can be set based on the desired attitude of the UAV, and the motor current can be measured by a suitable meter.

At step 1420, controller 112 communicates with sensors 126 to obtain air density. For example, the sensors may measure air temperature and air pressure, and controller 112 may use these measurements to calculate air density.

At step 1430, controller 112 uses the motor speed, motor current, and air density to calculate the motor torque.

At step 1440, the controller uses the motor torque and the motor speed to determine the blade pitch. For a given motor speed (RPM), the lower pitch provides higher motor torque, so the pitch can be determined using the motor torque and speed.

The process of determining the pitch is not limited to the specific kind of sensors or other particulars described herein except as defined by the appended claims.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Some embodiments provide a system comprising a ratchet mechanism comprising a ratchet wheel configured to be rotated by a motor about a first axis (e.g. 610). The ratchet mechanism comprises one or more followers each of which is coupled to the ratchet wheel. The ratchet wheel rotates the one or more followers in a first direction (e.g. 650) about the first axis when the ratchet wheel is rotated by the motor in the first direction about the first axis. The system further comprises one or more rotor blades mounted to rotate about the first axis, each rotor blade being affixed to a respective follower of the one or more followers, each follower controlling a pitch of the respective rotor blade based on a position of the follower relative to the ratchet wheel.

In some embodiments, each follower is configured to change its position relative to the ratchet wheel in response to the ratchet wheel rotating relative to the one or more followers about the first axis in a second direction opposite to the first direction.

In some embodiments, the ratchet wheel comprises a surface facing the one or more rotor blades and having a plurality of detents, at least two of the detents being configured to keep any one of the followers at different positions corresponding to different pitches of a respective one of the one or more rotor blades.

In some embodiments, each detent comprises a slot, the system further comprises a spring biasing the one or more followers toward the ratchet wheel, to bias each follower towards a bottom of a slot when the follower is in the slot.

In some embodiments, the system further comprises a controller configured to control the motor. The motor is operable to provide fixed-pitch operation in which the motor generates a motor torque to rotate the ratchet wheel in the first direction and the ratchet wheel transmits the motor torque to each follower to rotate each follower in the first direction while remaining in a respective predefined position relative to the ratchet wheel. In response to the controller obtaining a command requiring a change in a pitch of the one or more rotor blades, the controller causes the motor to slow down rotation of the ratchet wheel in the first direction sufficiently abruptly to cause each follower to rotate in the first direction relative to the ratchet wheel to change each follower's position relative to the ratchet wheel thus changing the pitch of the one or more rotor blades.

In some embodiments, the controller causing the motor to slow down rotation of the ratchet wheel in the first direction comprises the controller causing the motor to rotate the ratchet wheel in a second direction opposite to the first direction.

In some embodiments, the system further comprises a hub connected to each rotor blade through a respective revolute joint allowing the rotor blade to rotate to change the pitch of the rotor blade.

In some embodiments, the one or more followers are configured to transmit torque from the motor to the hub and to the one or more rotor blades when the ratchet wheel rotates the one or more followers in the first direction.

In some embodiments, the system further comprises a spring biasing the hub towards the ratchet wheel.

In some embodiments, each rotor blade is connected to the hub through a respective arm affixed to the rotor blade and forming the respective revolute joint with the hub.

In some embodiments, a system comprises a controller configured to determine a pitch of at least one rotor blade of the system. Determining the pitch comprises: determining a speed and electric current of the motor; obtaining air density of surrounding air; determining a motor torque of the motor from at least the motor speed, the electric current, and the air density; and determining the pitch from at least the motor torque and the motor speed.

In some embodiments, the air density is calculated by the controller from air pressure and air temperature.

Some embodiments provide a method comprising rotating a ratchet wheel by a motor about a first axis. The ratchet wheel is in a fixed position relative to one or more followers rotated about the first axis by the ratchet wheel. The method comprises controlling by each follower a pitch of a respective rotor blade affixed to the follower and rotating about the first axis, the pitch being controlled based on the position of the follower relative to the ratchet wheel.

In some embodiments, rotating the ratchet wheel comprises controlling a torque of the motor to change the position of each follower relative to the ratchet wheel.

In some embodiments, the ratchet wheel comprises a surface facing the one or more rotor blades and having a plurality of slots, at least two of the slots being configured to keep any one of the followers at different positions corresponding to different pitches of a respective one of the one or more rotor blades. The method comprises controlling the torque to cause each follower to move between slots of different depths.

In some embodiments, the method comprises biasing the one or more followers toward the ratchet wheel by a spring, to bias each follower towards a bottom of a slot when the follower is in the slot.

In some embodiments, rotating the ratchet wheel by the motor comprises rotating the ratchet wheel in a first direction to provide fixed-pitch operation in which the motor generates a motor torque and the ratchet wheel transmits the motor torque to each follower to rotate each follower in the first direction while each follower remains in a respective predefined position relative to the ratchet wheel. In response to obtaining a command requiring a change in a pitch of the one or more rotor blades, the motor is caused to slow down rotation of the ratchet wheel in the first direction sufficiently abruptly to cause each follower to rotate in the first direction relative to the ratchet wheel to change each follower's position relative to the ratchet wheel thus changing the pitch of the one or more rotor blades.

In some embodiments, causing the motor to slow down rotation of the ratchet wheel in the first direction comprises causing the motor to rotate the ratchet wheel in a second direction opposite to the first direction.

In some embodiments, each rotor blade is connected to a hub through a respective revolute joint allowing the rotor blade to rotate relative to the hub to change the pitch of the rotor blade.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A system comprising:
a ratchet mechanism comprising a ratchet wheel configured to be rotated by a motor about a first axis, the ratchet mechanism comprising one or more followers each of which is coupled to the ratchet wheel, the ratchet wheel rotating the one or more followers in a first direction about the first axis when the ratchet wheel is rotated by the motor in the first direction about the first axis;

one or more rotor blades mounted to rotate about the first axis, each rotor blade being affixed to a respective follower of the one or more followers, each follower controlling a pitch of the respective rotor blade based on a position of the follower relative to the ratchet wheel; and a controller configured to determine a pitch of at least one rotor blade of the system, wherein to determine the pitch comprises:

determining a speed and/or torque of the motor;
determining an electric current of the motor; and
determining the pitch from at least the electric current and the determined speed and/or torque.

2. The system of claim 1, wherein each follower is configured to change its position relative to the ratchet wheel in response to the ratchet wheel rotating relative to the one or more followers about the first axis in a second direction opposite to the first direction.

3. The system of claim 1, wherein the ratchet wheel comprises a surface facing the one or more rotor blades and having a plurality of detents, at least two of the detents being configured to keep any one of the followers at different positions corresponding to different pitches of a respective one of the one or more rotor blades.

4. The system of claim 3, wherein each detent comprises a slot, the system further comprising a spring biasing the one or more followers toward the ratchet wheel, to bias each follower towards a bottom of a slot when the follower is in the slot.

5. The system of claim 1, wherein:

the motor is operable to provide fixed-pitch operation in which the motor generates a motor torque to rotate the ratchet wheel in the first direction and the ratchet wheel transmits the motor torque to each follower to rotate each follower in the first direction while remaining in a respective predefined position relative to the ratchet wheel; and in response to the controller obtaining a command requiring a change in a pitch of the one or more rotor blades, the controller causes the motor to slow down rotation of the ratchet wheel in the first direction sufficiently abruptly to cause each follower to rotate in the first direction relative to the ratchet wheel to change each follower's position relative to the ratchet wheel thus changing the pitch of the one or more rotor blades.

6. The system of claim 5, wherein the controller causing the motor to slow down rotation of the ratchet wheel in the first direction comprises the controller causing the motor to rotate the ratchet wheel in a second direction opposite to the first direction.

7. The system of claim 1, further comprising a hub connected to each rotor blade through a respective revolute joint allowing the rotor blade to rotate to change the pitch of the rotor blade.

8. The system of claim 7, wherein the one or more followers are configured to transmit torque from the motor to the hub and to the one or more rotor blades when the ratchet wheel rotates the one or more followers in the first direction.

9. The system of claim 7, further comprising a spring biasing the hub towards the ratchet wheel.

10. The system of claim 7, wherein each rotor blade is connected to the hub through a respective arm affixed to the rotor blade and forming the respective revolute joint with the hub.

11. The system of claim 1, wherein determining a speed and/or torque comprises:

determining the speed;
obtaining air density of surrounding air; and
determining the motor torque of the motor from at least the motor speed, the electric current, and the air density; and wherein determining the pitch comprises determining the pitch from at least the motor torque and the motor speed.

12. The system of claim 11, wherein the air density is calculated by the controller from air pressure and air temperature.

13. The system of claim 1, wherein the one or more rotor blades are part of a rotor operable to provide vertical lift and/or part of a propeller operable to provide horizontal thrust.

14. A method of using the system of claim 1, the method comprising:

rotating the ratchet wheel by the motor about the first axis, the ratchet wheel being in a fixed position relative to the one or more followers rotated about the first axis by the ratchet wheel; and controlling by each follower the pitch of the respective rotor blade affixed to the follower and rotating about the first axis, the pitch being controlled based on the position of the follower relative to the ratchet wheel.

15. The method of claim 14, wherein rotating the ratchet wheel comprises controlling the torque of the motor to change the position of each follower relative to the ratchet wheel.

16. The method of claim 15, wherein the ratchet wheel comprises a surface facing the one or more rotor blades and having a plurality of slots, at least two of the slots being configured to keep any one of the followers at different positions corresponding to different pitches of a respective one of the one or more rotor blades; and wherein the method comprises controlling the torque to cause each follower to move between slots of different depths.

17. The method of claim 16, further comprising biasing the one or more followers toward the ratchet wheel by a spring, to bias each follower towards a bottom of a slot when the follower is in the slot.

18. The method of claim 14, wherein rotating the ratchet wheel by the motor comprises:

rotating the ratchet wheel in the first direction to provide fixed-pitch operation in which the motor generates the motor torque and the ratchet wheel transmits the motor torque to each follower to rotate each follower in the first direction while each follower remains in a respective predefined position relative to the ratchet wheel; and in response to obtaining a command requiring a change in a pitch of the one or more rotor blades, causing the motor to slow down rotation of the ratchet wheel in the first direction to cause each follower to rotate in the first direction relative to the ratchet wheel to change each follower's position relative to the ratchet wheel thus changing the pitch of the one or more rotor blades.

19. The method of claim 18, wherein causing the motor to slow down rotation of the ratchet wheel in the first direction comprises causing the motor to rotate the ratchet wheel in a second direction opposite to the first direction.

20. The method of claim 14, wherein each rotor blade is connected to a hub through a respective revolute joint allowing the rotor blade to rotate relative to the hub to change the pitch of the rotor blade.

\* \* \* \* \*